(12) United States Patent
Cui et al.

(10) Patent No.: US 11,727,354 B2
(45) Date of Patent: *Aug. 15, 2023

(54) SYSTEMS AND METHODS FOR INITIAL ITEM GROUPING LOGIC

(71) Applicant: COUPANG CORP., Seoul (KR)

(72) Inventors: Xiaohua Cui, Shanghai (CN); Quan Luo, Shanghai (CN); Zhijun Xu, Shanghai (CN); Rubin Zhao, Shanghai (CN)

(73) Assignee: COUPANG CORP., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/644,556

(22) Filed: Dec. 15, 2021

(65) Prior Publication Data
US 2022/0108271 A1 Apr. 7, 2022

Related U.S. Application Data

(63) Continuation of application No. 16/791,432, filed on Feb. 14, 2020, now Pat. No. 11,232,401.

(51) Int. Cl.
*G06Q 10/0875* (2023.01)
*G06Q 10/04* (2023.01)
*G06Q 30/0601* (2023.01)

(52) U.S. Cl.
CPC ......... *G06Q 10/0875* (2013.01); *G06Q 10/04* (2013.01); *G06Q 30/0635* (2013.01)

(58) Field of Classification Search
CPC ............... G06Q 10/0875; G06Q 10/04; G06Q 30/0635; G06Q 10/0834; G06Q 10/06311; G06Q 10/087
See application file for complete search history.

(56) References Cited

U.S. PATENT DOCUMENTS

| | | | |
|---|---|---|---|
| 6,876,958 B1 * | 4/2005 | Chowdhury | G06Q 10/04 703/2 |
| 7,979,359 B1 * | 7/2011 | Young | G06Q 10/06 705/28 |

(Continued)

FOREIGN PATENT DOCUMENTS

| | | |
|---|---|---|
| CN | 109747897 A | 5/2019 |
| KR | 10-1572857 B1 | 11/2015 |

(Continued)

OTHER PUBLICATIONS

Pisinger, David "Heuristics for the container loading problem" European Journal of Operational Research vol. 141, Issue 2, Sep. 1, 2002, pp. 382-392 (Year: 2002).*

(Continued)

*Primary Examiner* — Michael Jared Walker
(74) *Attorney, Agent, or Firm* — Finnegan, Henderson, Farabow, Garrett & Dunner, LLP

(57) ABSTRACT

The present disclosure provides systems and methods for automatic packaging determination comprising a memory storing instructions and at least one processor performing steps comprising: receiving an order comprising at least one item; searching a data store to determine a tag, volume, and weight associated with each item; sorting the items into groups based on the tags of the items; performing an optimization process for each group of items having the same tag by: creating a data structure representing a first package of the group; iteratively simulating packing a largest remaining item of the group into the first package, wherein if the simulating determines that a threshold is exceeded: creating an additional data structure representing an additional package, and iteratively simulating packing a largest remaining item until all items of the group are packed (Continued)

into a package; and generating at least one list of items for the data structures representing packages.

18 Claims, 11 Drawing Sheets

(56) References Cited

U.S. PATENT DOCUMENTS

| | | | |
|---|---|---|---|
| 8,326,679 B1* | 12/2012 | Rowe | G06Q 10/08 705/28 |
| 8,401,975 B1* | 3/2013 | Tian | G06Q 10/08 705/332 |
| 8,554,694 B1* | 10/2013 | Ward | G06Q 30/0635 705/330 |
| 8,554,702 B2* | 10/2013 | Arunapuram | G06Q 10/06 703/2 |
| 8,560,461 B1* | 10/2013 | Tian | G06Q 10/087 705/332 |
| 9,082,148 B1* | 7/2015 | Oczkowski | G06Q 30/0601 |
| 9,280,756 B2* | 3/2016 | Hara | G06Q 10/087 |
| 9,619,775 B1* | 4/2017 | Saito | G06Q 10/08345 |
| 9,926,131 B1* | 3/2018 | Lehmann | B65D 85/62 |
| 10,118,722 B2* | 11/2018 | Serjeantson | B65B 57/06 |
| 10,147,129 B1* | 12/2018 | Shang | G06Q 30/0633 |
| 10,332,060 B2* | 6/2019 | Tian | G06Q 10/083 |
| 10,705,488 B1* | 7/2020 | Cui | G06F 16/245 |
| 2002/0178074 A1* | 11/2002 | Bloom | G06Q 20/00 705/26.81 |
| 2016/0019633 A1* | 1/2016 | Waddington | G06Q 20/203 705/26.81 |
| 2017/0061349 A1* | 3/2017 | Zhang | G06Q 10/087 |
| 2018/0374046 A1* | 12/2018 | Powers | G06Q 10/08345 |
| 2020/0065758 A1* | 2/2020 | Kumar | G06Q 10/0875 |
| 2021/0241197 A1* | 8/2021 | Kim | G06F 7/24 |

FOREIGN PATENT DOCUMENTS

| | | |
|---|---|---|
| KR | 10-2018-0049321 A | 5/2018 |
| KR | 10-1969570 B1 | 4/2019 |

OTHER PUBLICATIONS

International Search Report and Written Opinion in counterpart Application No. PCT/IB2020/061754 dated Mar. 16, 2021 (9 pages).
Notice of Preliminary Rejection dated Nov. 25, 2020, in counterpart Korean Patent Application No. 10-2020-0056687 (10 pages).
Decision of Patent Grant dated May 18, 2021, in counterpart Korean Patent Application No. 10-2020-0056687 (4 pages).
Office Action and Search Report, dated Nov. 11, 2021, issued by the Taiwan Intellectual Property Office in R.O.C. Patent Application No. 109146240 (25 pages).
Pisinger, David; "Heuristics for the container loading problem"; European Journal of Operational Research; vol. 141, Issue 2; Sep. 1, 2002; pp. 382 to 392 (11 pages).
Hong Kong Office Action dated Feb. 23, 2021, in counterpart Hong Kong Application No. 22021023328.8 (13 pages).
Notice of Preliminary Rejection dated Nov. 23, 2022, in counterpart Korean Application No. 10-2021-0109366. (12 pages).
Further Examination Notice in counterpart Hong Kong Application No. 22021023328.8 dated Jun. 30, 2023 (13 pages).

* cited by examiner

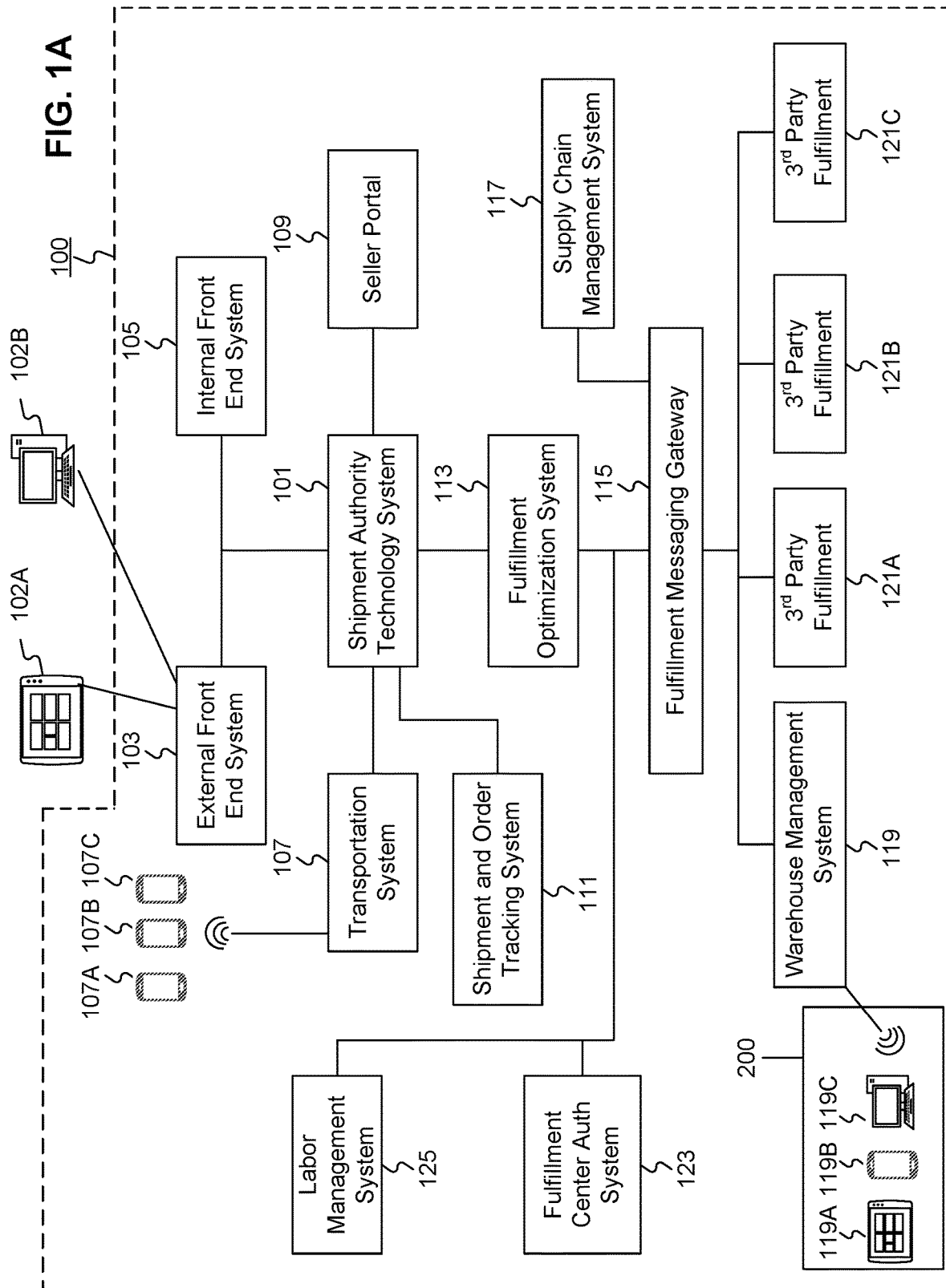

ns for computerized
systems and methods for computer-determined efficient
packaging. In particular, embodiments of the present dis-# SYSTEMS AND METHODS FOR INITIAL ITEM GROUPING LOGIC

CROSS-REFERENCE TO RELATED APPLICATIONS

This application is a continuation of U.S. patent application Ser. No. 16/791,432, filed Feb. 14, 2020, currently pending and allowed, the disclosure of which is expressly incorporated herein by reference in its entirety.

TECHNICAL FIELD

The present disclosure generally relates to computerized systems and methods for computer-determined efficient packaging. In particular, embodiments of the present disclosure relate to inventive and unconventional systems and methods utilized for handling of incoming orders and preparing said orders for further processing and shipping by automatically grouping ordered items into packing lists based on item characteristics in order to minimized packing material and shipment costs.

BACKGROUND

Efficient packaging operation is a corner stone of any business that relies on shipping products to a consumer. If the packaging operation process is inefficient and takes a significant amount of time, delivery of products to customers may ultimately be delayed further the business will not be able to stay competitive suffering additional shipping expenses. Delayed and/or improperly packaged goods can lead to poor customer satisfaction, and a review from a dissatisfied customer may discourage potential purchases from other customers. The packaging process may be costly to businesses in various ways. For example, a business may incur additional shipping costs due to overuse of packaging material. In addition, if one or more products are damaged due to the improper packaging, a business may be forced to reimburse the customer for the cost of the damaged goods. As such, the less efficient the process is the greater the loss for the business.

To mitigate such problems that may arise during packaging operation, conventional systems may sort available boxes by volume and fill them with goods based on the dimensions of the goods. However, taking volume in the account is not enough and damaged and/or improperly packaged goods can lead to poor customer satisfaction. For example, harmful products may be shipped alongside food items if boxes are filled solely on the dimensions of the goods, potentially harming the customer and reducing customer satisfaction. In other scenarios, fragile items may be packed alongside heavy items which damage the fragile items during shipment. Further, conventional systems suffer from overuse of boxes and packaging materials which increases cost. Alternatively the process may be performed using manual labor. However, manually packing each box of products may be time consuming. As such, the time it takes to complete packaging my increase, thereby decreasing profit and increasing the shipment and delivery time of products to customers.

Therefore, there is a need for improved methods and systems for efficient pre-sorting of ordered items into packing lists. In particular, there is a need for improved systems and methods for efficient packaging of ordered items based on the iterative simulation of the packaging process to pre-group like items into packing lists satisfying weight and volume restrictions. With these systems and methods, packing operation efficiency may increase, while packaging and reimbursement costs decrease, thereby reducing overall business costs and improving customer satisfaction. Additionally, by pre-grouping items to satisfy weight and volume limitations, as well as packaging restrictions of individual items, these systems and methods may decrease the time and processing required by other algorithms that configure items within packages,

SUMMARY

One aspect of the present disclosure is directed to a computerized system for determining item groupings for packaging, comprising: at least one processor; and at least one non-transitory storage medium comprising instructions that, when executed by the at least one processor, cause the at least one processor to perform steps comprising: receiving an order comprising at least one item; searching at least one data store to determine a tag, volume, and weight associated with each item; sorting the items into groups based on the tags of the items; performing an optimization process for each group of items having the same tag by: creating a data structure representing a first package of the group, the data structure comprising properties of the first package; iteratively simulating packing a largest remaining item of the group into the first package, wherein if the simulating determines that a threshold is exceeded: creating an additional data structure representing an additional package, and iteratively simulating packing a largest remaining item until all items of the group are packed into a package; and generating at least one list of items for the data structures representing packages; and sending the generated list to a computer system for display, the list including at least one item identifier and at least one package identifier.

Another aspect of the present disclosure is directed to a computer-implemented method for automatically determining item groupings for packaging, comprising: receiving an order comprising at least one item; searching at least one data store to determine a tag, volume, and weight associated with each item; sorting the items into groups based on the tags of the items; performing an optimization process for each group of items having the same tag by: creating a data structure representing a first package of the group, the data structure comprising properties of the first package; iteratively simulating packing a largest remaining item of the group into the first package, wherein if the simulating determines that a threshold is exceeded: creating an additional data structure representing an additional package, and iteratively simulating packing a largest remaining item until all items of the group are packed into a package; and generating at least one list of items for the data structures representing packages; and sending the generated list to a computer system for display, the list including at least one item identifier and at least one package identifier.

Yet another aspect of the present disclosure is directed to a computerized system for determining item groupings for packaging wherein the steps further comprise: determining that the received order comprises at least one item associated with the standalone tag; and searching the at least one data store to determine a binding number associated with the items having the standalone tag; wherein the threshold comprises the binding number.

Yet another aspect of the present disclosure is directed to a computer-implemented method for automatically determining item groupings for packaging comprising: receiving an order comprising at least one item; searching at least one data store to determine a tag, volume, and weight associated with each item; determining that the received order comprises items having a standalone tag; searching the at least one data store to determine a binding number associated with the items having the standalone tag; sorting the items having the standalone tag into a group; performing an optimization process for the group by: creating a data structure representing a first package of the group; iteratively simulating packing items having the standalone tag in packages of same items, wherein if the simulating determines that the binding number associated with the item is exceeded: creating an additional data structure representing an additional package, and iteratively simulating packing items having the standalone tag in packages of same items until all items of the group are packed into a package; and generating at least one list of items for the data structures representing packages; and sending the generated list to a computer system for display, the list including a number of packages, a number of items for each package, and packaging materials needed for each package.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for efficient grouping of ordered items into packages.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
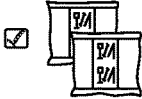
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3$^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
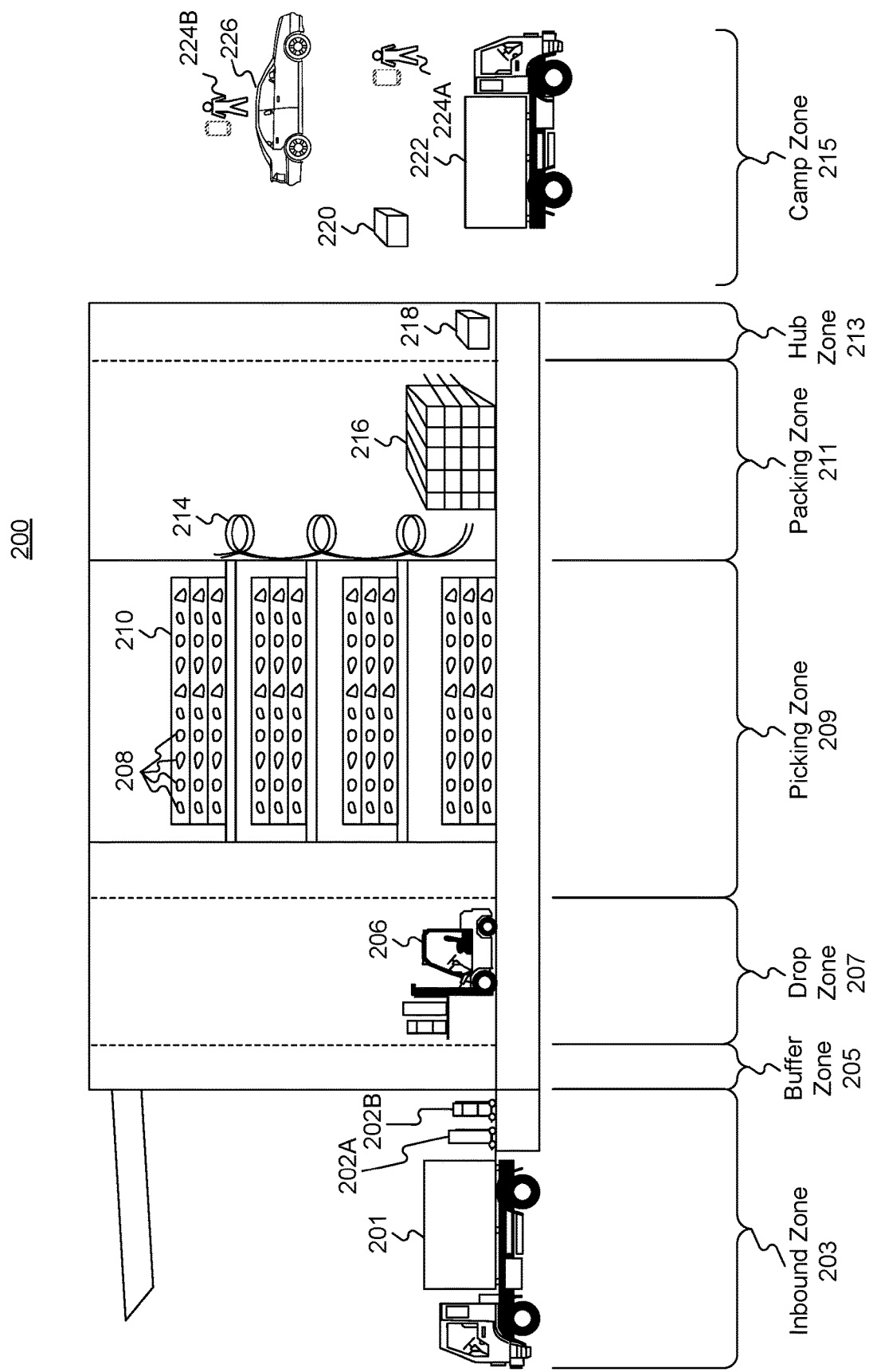
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
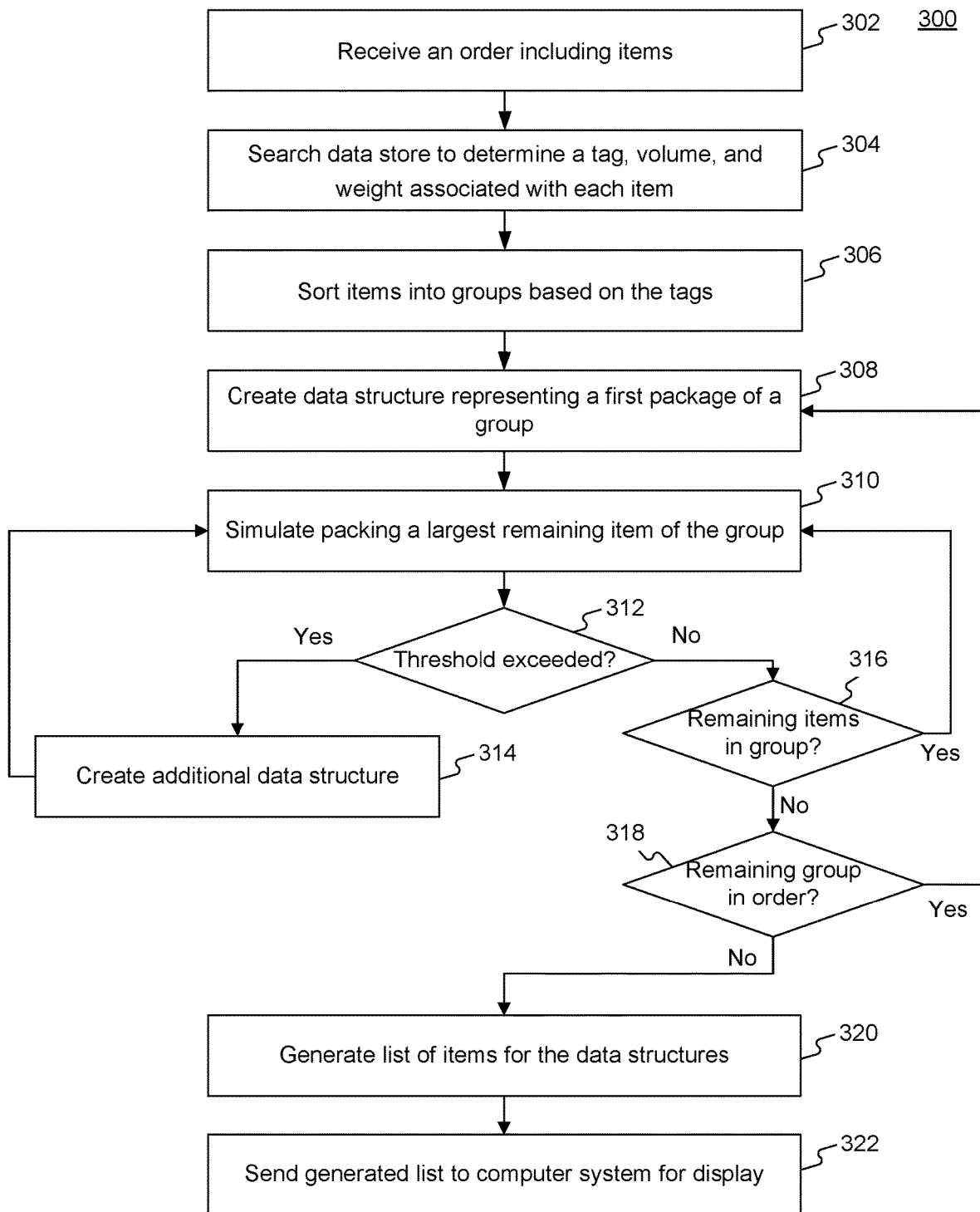
FIG. 3 is a flow chart illustrating an exemplary embodiment of a method for efficient pre-grouping of ordered items, consistent with the disclosed embodiments.

FIG. 3 illustrates an outline of the main process for efficient packaging of ordered items. Process 300 starts at step 302. In step 302, FO system 113 begins with receiving an order comprising at least one item. The order may constitute a variety of items, i.e. a mix of consumable, non-consumable, fragile, hazardous, large, and small items.

Process 300 then proceeds to step 304. In step 304, FO system 113 collects information about the order. Collected information about the order may comprise a variety of data, i.e. information about the order itself such as quantity of the items in the order, total cost of the ordered items, etc. Additionally, information about individual items within the order may be collected. For example, volume, weight, cost or other specific tags associated with each item may be determined from at least one data store. Tags may include fragile, indicating that the item requires additional packaging to prevent breakage, standalone, indicating that the item does not require additional packaging, and normal, indicating that the item requires standard packaging. In some embodiments, the volume of an item having the fragile tag may include the volume of the item and the volume of added packaging material for the fragile item.

Process 300 then proceeds to step 306. In step 306, FO system 113 may sort ordered items into groups. Step 306 may be performed based on the information collected in step 304, such as the tags of the items. For example, fragile items may be grouped separately from normal and standalone items. In some embodiments, items might be sorted based on other collected characteristics such as dimensions, weight, and cost. Sorting may be performed based on the individual characteristics or on a combination thereof.

Process 300 then proceeds to step 308. In step 308, FO system 113 begins an optimization process for each group of items having the same tag. Process 300 creates a data structure representing a first package of a group. The data structure representing a package may be a list, dictionary, tuple, array, or the like. The data structure representing a package may include properties of the first package, such as weight and dimension thresholds that may be preset by a transportation vendor. Data structures representing packages may also include cost. If multiple shipping vendors are used, multiple thresholds may be recorded in the data structure representing a package to take into account difference in cost across all the available vendors.

Process 300 then proceeds to iteratively simulate packing a largest remaining item of the group in step 310. The largest remaining item may be determined by volume or weight. In step 310, process 300 may provisionally add the largest remaining item to the data structure representing the package. For example, to computationally simulate adding an item to a package, process 300 may add the item as an element in the data structure associated with a numbered package. Details about the item, such as volume and weight, may also be added to the data structure representing a package. For instance, a package may be represented by a dictionary or a JSON file containing information about the package, such as weight and volume limits. The dictionary may also contain a sub-dictionary of items to be shipped in the corresponding package. Process 300 may add items to the sub-dictionary, and include the item's weight and volume. In this way, process 300 may quickly determine the total volume and weight of all items in the dictionary, and may remove an item if addition of the item causes the total volume or weight to exceed a threshold. In some embodiments, the data structure representing a package may contain an element representing the remaining volume or weight of the package. Each time a new item is added to the data structure representing a package, the item's weight and volume may be subtracted from the respective elements so that process 300 does not need to recalculate the total volume and weight of the items for each iteration.

Process 300 analyzes the data structure representing a package in step 312 to determine if a threshold associated with the data structure representing the package has been exceeded. For example, process 300 may determine that the total volume of the items in the data structure corresponding to the package exceeds the volume of the package. FO system 113 may use dimensions of the items of the group to determine the largest item of the group, and further calculate remaining space in the package by subtracting the volume of the largest remaining item from the volume of the first package.

Alternatively, process 300 may determine that the total weight of the items exceeds the weight limit of the package. Additionally, process 300 may also search the at least one data store to determine a binding number associated with the items having the standalone tag, where the binding number represents the quantity of identical items that may be bound by tape, string, binding straps, and the like, rather than being shipped in a box. Furthermore, for items having the standalone tag, the threshold may comprise the binding number, such that a package may contain up to the binding number of like items bound together by bands. For example, a bicycle may be shipped to the customer in the same box that the manufacturer delivered to the seller. Rather than repackaging the bicycle, the seller may indicate that the bicycle is a standalone item. The seller may also set a binding number of two, indicating that up to two bicycles may be bound together and form a single package.

If a threshold is exceeded, step 312 is YES, and process 300 proceeds to create an additional data structure representing a package at step 314 representing an additional package. In this manner, additional packages may be added to accommodate items from the order. After a new data structure representing a package is added in step 314, process 300 returns to step 310 and adds the largest remaining item of the group to the new data structure representing a package.

Alternatively, if process 300 determines at step 312 that no threshold is exceeded, step 312 is NO, and process 300 determines if there are remaining items in the group at step 316. If there are remaining items in the group, step 316 is YES, and process 300 returns to step 310 to continue iteratively simulating packing a largest remaining item of the group.

However, if there are no remaining items in the group, step 316 is NO, and process 300 proceeds to determine if there are any remaining groups in the order at step 318. If step 318 is YES, process 300 returns to step 308 to create an additional data structure representing a first package of the next group. Process 300 thus iteratively simulates packing a largest remaining item until all items of each group are simulated to be packed into a package.

When no more items remain, step 318 is NO, and process 300 generates at least one list of items for the data structures representing packages at step 320. In other words, the lists represent which items should be in each package. The lists may include at least one item identifier and at least one package identifier. These lists are then sent to a computer system for display at step 322. With this information, a human packing technician may be provided instructions on how to group items together to minimize packaging and shipping costs. Alternatively, the lists may be provided to another computer system to determine specific packing configurations of the items, taking into account individual items' length, width, and height.

For example, if a received order contains two items having the "normal" tag with volumes of $0.5 \text{ m}^2$ and $0.3 \text{ m}^2$, and one item having the "fragile" tag, and if a package volume limit is $0.75 \text{ m}^2$, process 300 would first assign the normal item having $0.5 \text{ m}^2$ to the first data structure representing a package at step 310. Process 300 would determine that step 312 is NO, because the volume of the item is less than the volume of the package. Proceeding to step 316, process 300 would determine that there is a remaining item in the normal group, and return to step 310 to simulate packing the item having a volume of $0.3 \text{ m}^2$. In this case, the combined volume of the items of $0.8 \text{ m}^2$ would exceed the package volume limit of $0.75 \text{ m}^2$, and step 312 would be YES. Process 300 then proceeds to step 314 to create an additional data structure for a second package, and returns to step 310 to assign the item with a volume of $0.3 \text{ m}^2$ to the second package. The volume threshold would not be exceeded at step 312 (step 312—NO), and no more items would remain in the group at step 316 (step 316—NO). However, process 300 would determine at step 318 that the fragile group remained in the order (step 318—YES), and process 300 would return to step 308 to create a new data structure representing a package and simulate packing the remaining fragile item.

In some embodiments, FO system 113 may further include various packaging materials in the list of items such as plastic bags, bubble wrap, etc. Additionally, FO system 113 may also include package details as package identifiers, including the combination of the material used and specific dimensions and qualities of the packaging materials. For example, the set of instruction might specify that shipment group will be packaged in a 8¹⁵⁄₁₆"×5¹⁵⁄₁₆"×3⅛" box, double wall board (DWB), that some of the items will be packaged in the bubble wrap prior to boxing it up, and that remaining empty space will be filled with airbags.

Figure 4:
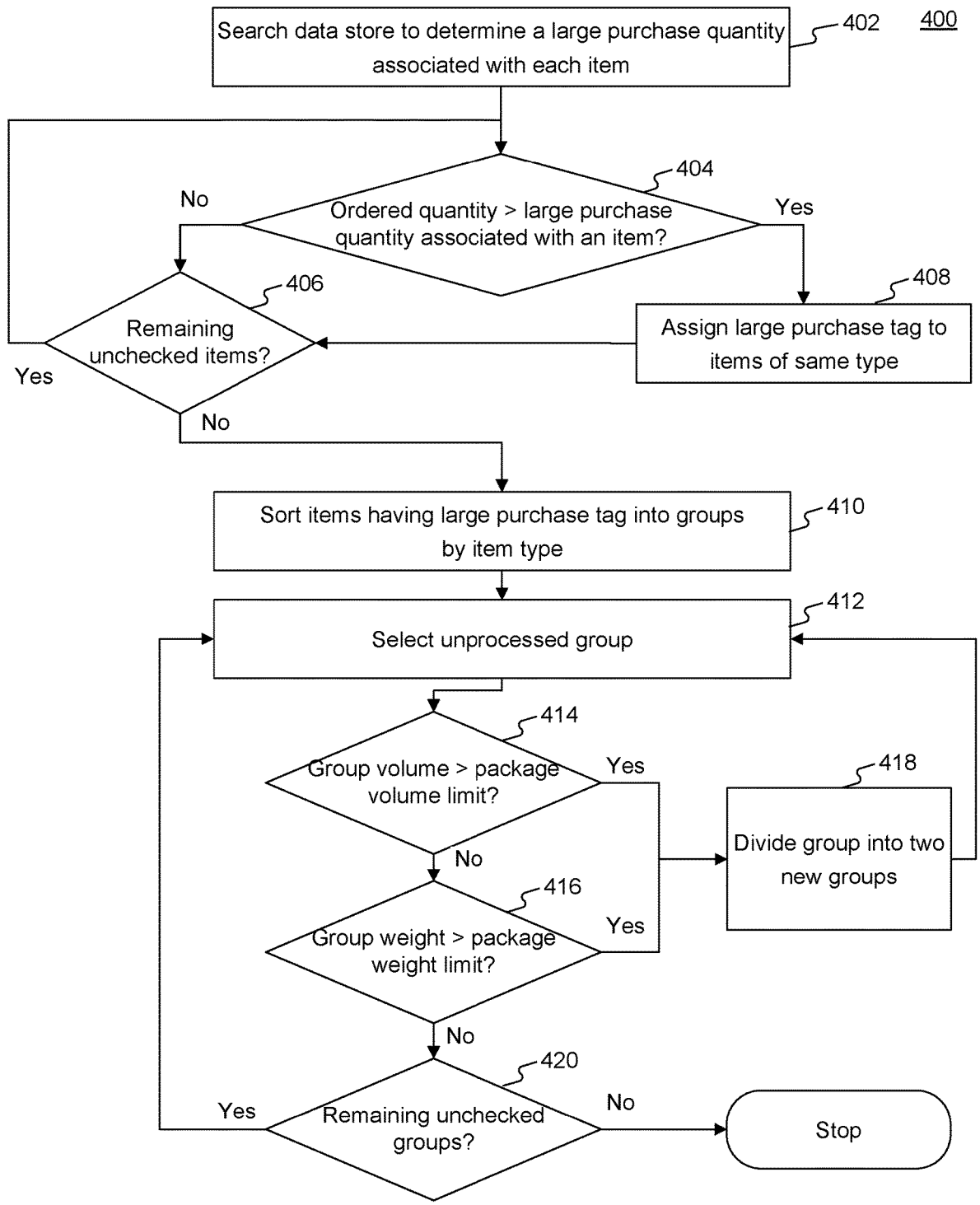
FIG. 4 is a flow chart illustrating an exemplary embodiment of a method for efficient pre-grouping of ordered items in a case when at least one item is associated with a large purchase quantity, consistent with the disclosed embodiments.

FIG. 4 illustrates a subroutine 400 of the main process performed by the FO system 113 as depicted in FIG. 3. Specifically, in some embodiments, subroutine 400 is a part of step 306 for sorting items into groups based on the tags in the case when a large number of similar items are ordered.

Subroutine 400 begins at step 402 by searching the at least one data store to determine a large purchase quantity associated with each item. Each item may have an associated quantity that triggers the large purchase tag. For example, an order of ten boxes of tissues may trigger the large purchase tag for the tissue boxes in the order. Subroutine 400 then compares the ordered quantity with the large purchase quantity associated with each item at step 404. If a quantity of the items of the same type in the order exceeds the large purchase quantity associated with the items of the same type, step 404 is YES, and subroutine 404 assigns a large purchase tag to each of the items of the same type. If step 404 is NO, subroutine 400 determines if there are any remaining unchecked items at step 406. If step 406 is YES, subroutine 400 returns to step 404 and checks the next item. If step 406 is NO, subroutine 400 proceeds to step 410.

At step 410, subroutine 400 sorts items into a group of the same item type if an item has the large purchase tag. These groups may be further processed to meet weight and volume limitations of available packaging. Thus, at step 412, subroutine 400 selects an unprocessed group of items of the same type. At step 414, subroutine 400 determines if the total volume of the group is greater than the package volume limit. Similarly, at step 416, subroutine 400 determines if the total weight of the group is greater than the package weight limit. If either step 414 or step 416 are YES, subroutine 400 proceeds to step 418 and divides the group into two new groups at step 418. Subroutine 400 then returns to step 412 to iteratively select unprocessed groups.

If, however, step 414 and step 416 are NO, such that the group is under the volume and weight limits of the package, subroutine 400 proceeds to step 420 to determine if there are any remaining unchecked groups. If step 420 is NO, subroutine 400 finishes. If step 420 is YES, subroutine 400 returns to step 412 to process the next group.

For example, subroutine 400 may determine that a customer's purchase of 575 socks is above the large purchase quantity associated with socks at step 404. The socks in the order may then be assigned the large purchase tag at step 408. Subroutine 400 would then sort all of the socks into a single group at step 410, select the group at step 412, and then determine that the volume of 575 socks is greater than the volume limit of the available package. The socks may then be split into two groups, one having 287 socks and another having 288 socks, at step 418. Subroutine 400 would then return to step 412, and select the group having 288 socks, for instance. In this iteration, subroutine 400 may determine that a group of 288 socks is less than the volume limit and weight limit of the package (step 414 and step 416 NO), determine that an unchecked group of 287 socks remains at step 420, and return to step 412 to process the remaining group of 287 socks. In this manner, subroutine 400 iteratively simulates packing items having the large purchase tag by dividing a group having items of the same type into subgroups until a volume and a weight of each subgroup are less than or equal to a volume and a weight limit of a package, respectively.

Figure 5:
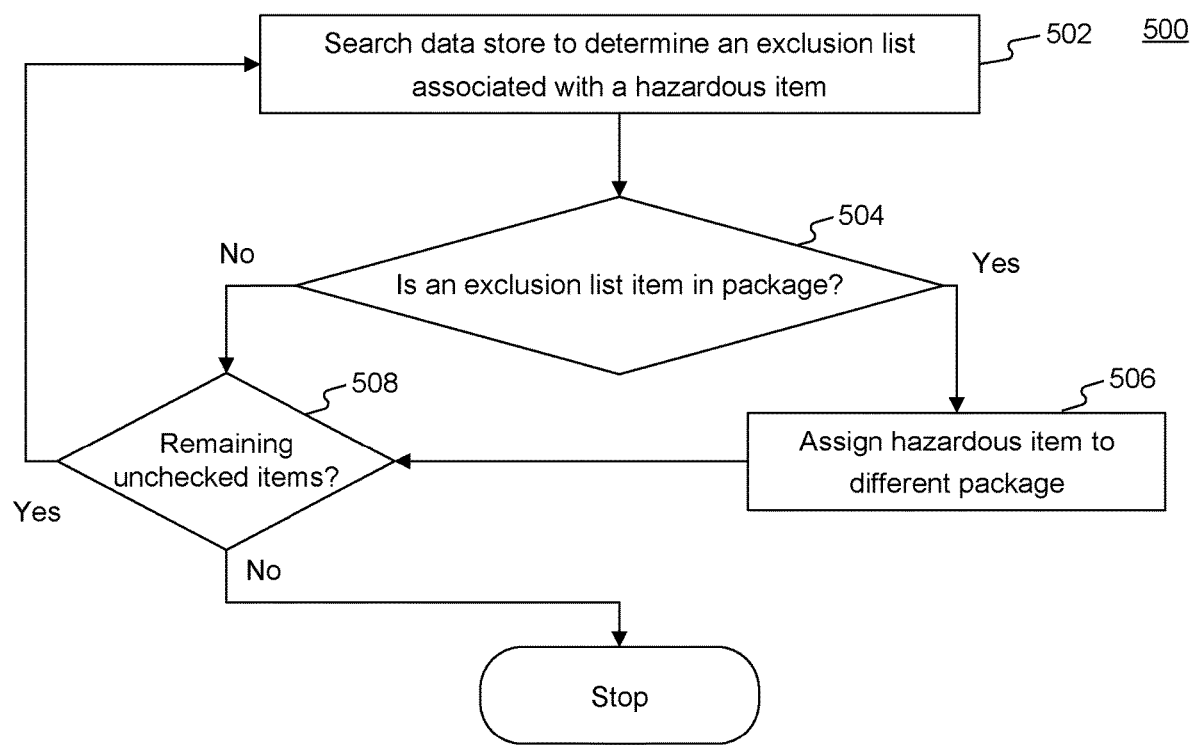
FIG. 5 is a flow chart illustrating an exemplary embodiment of a method for efficient pre-grouping of hazardous ordered items, consistent with the disclosed embodiments.

FIG. 5 illustrates a flow chart depicting subroutine 500 utilized by the FO system 113 for handling items that may be hazardous. For example, a business may prohibit drain cleaner being shipped alongside food products. Subroutine 500 for checking if mutually exclusive items are simulated to be packaged together may be performed alongside step 312 of process 300, for instance.

At step 502, subroutine 500 searches the at least one data store to determine an exclusion list of items that may not be in the same package as a hazardous item. For example, if an order contains rat poison, subroutine 500 may determine that the exclusion list associated with rat poison is a list of all edible items. Similarly, in some embodiments, non-hazardous products may also be associated with exclusion lists to prevent the non-hazardous product being packaged with hazardous products. For instance, apples may have an exclusion list containing rat poison.

At step 504, subroutine 500 determines if any of the items from the exclusion list for an item are already assigned to a data structure corresponding to a package. If step 504 is YES, the hazardous item is assigned to a data structure associated with a different package. Alternatively, a new data structure representing a package may be created for the hazardous item, to enable it to be shipped in a different package. If step 504 is NO, or if step 506 has been completed, subroutine 500 proceeds to step 508 and determines if there are any remaining unchecked items. If step 508 is NO, subroutine 500 finishes. Otherwise, subroutine 500 proceeds to step 502 and iteratively checks each item in the order for a conflict with the item's exclusion list. Thus, if the simulating determines that an item from the exclusion list is packed into a package, the hazardous item is assigned to a different package.

Figure 6:
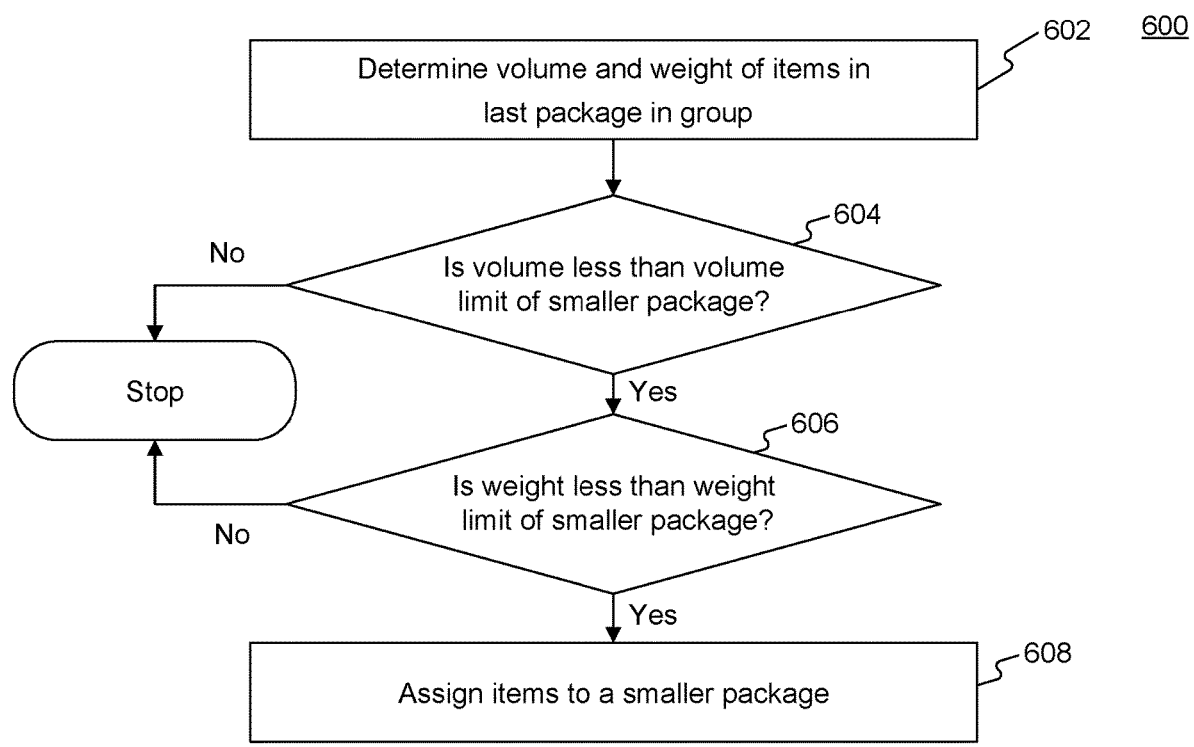
FIG. 6 is a flow chart illustrating an exemplary embodiment of a method for assigning items to smaller packages, consistent with the disclosed embodiments.

FIG. 6 illustrates a flow chart depicting an exemplary method for assigning items to smaller packages. Because shipping and packaging may cost less for smaller packages than larger packages, a company may opt for smaller packages when possible to reduce costs. Subroutine 600 therefore determines if the last package needed to fulfill an order may be smaller than the other packages in the order.

Subroutine 600 begins by determining the volume and weight of items simulated to be packed in the last package of a group at step 602. Subroutine 600 then determines if the total volume is less than the volume limit of a smaller package than is currently assigned at step 604, and also determines if the total weight is less than the weight limit of a smaller package at step 606.

If both step 604 and 606 are YES, subroutine 600 proceeds to step 608 and assigns the items previously assigned to the last package to a package having a smaller volume. This may be accomplished, for instance, by altering the packaging details recorded in the data structure for the package. Alternatively, subroutine 600 may create a new data structure representing a package, and assign the items to the new data structure representing a package. On the other hand, if either of steps 604 and 606 are NO, subroutine 600 stops, and the data structure representing a package is maintained.

Figure 7:
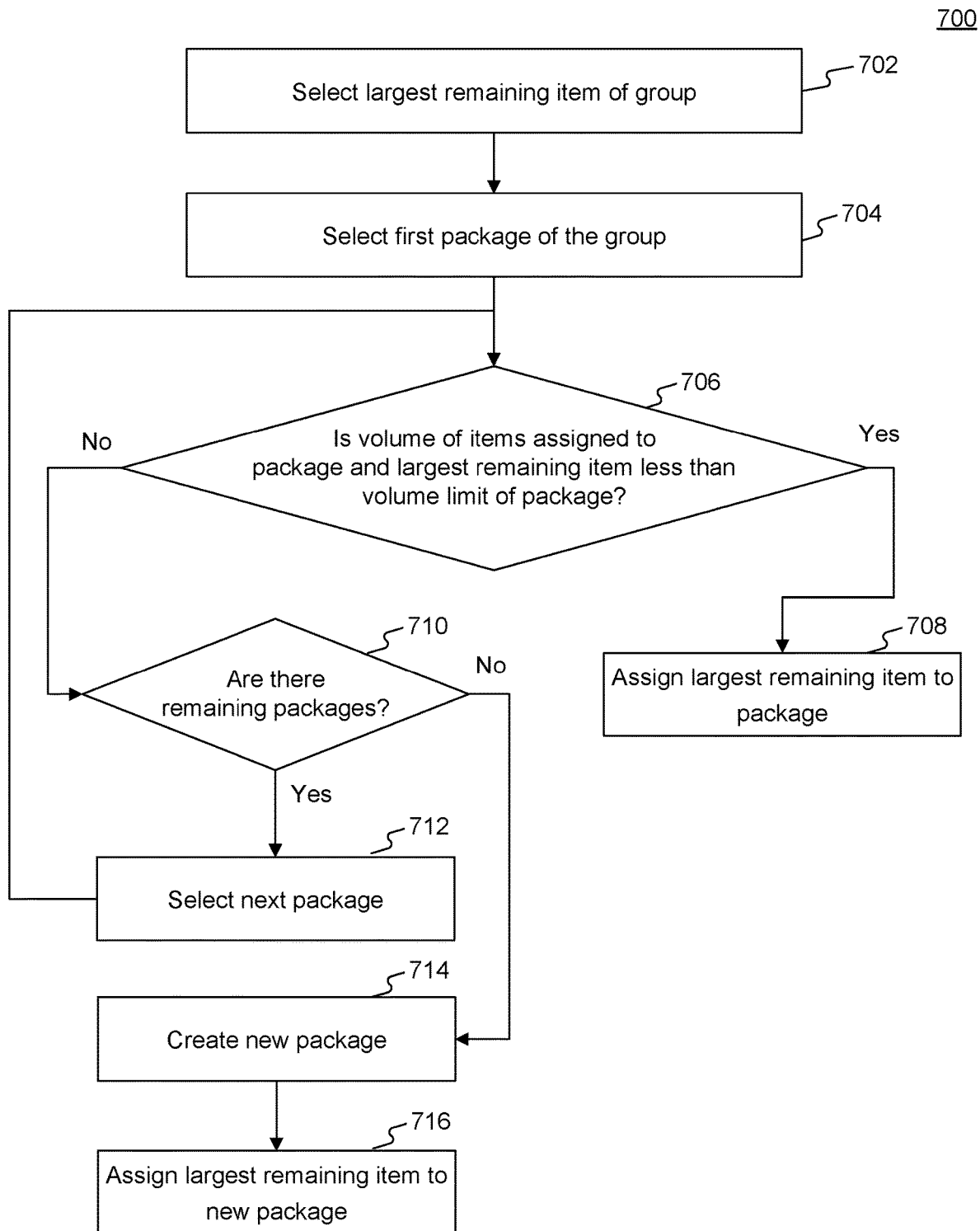
FIG. 7 is a flow chart illustrating an exemplary embodiment of a method for assigning the largest remaining item of a group to existing packages, consistent with the disclosed embodiments.

FIG. 7 illustrates a flow chart of an exemplary method for assigning the largest remaining item of a group to existing packages. When pre-sorting items into shipping groups in order of size, empty space may remain in a package because the largest items cannot be combined to fit in a single package. Smaller items, however, may be able to fill the voids between larger items in a package. Subroutine 700 illustrated in FIG. 7 may occur as part of step 310 or process 300, for example.

Subroutine 700 begins at step 702 by selecting the largest remaining item of a group that has not yet been assigned to a data structure representing a package. Subroutine 700 then selects the first package that was created for the group at step 704, and, at step 706, determines if the total volume of the largest remaining item and the items already assigned to the data structure representing a package is less than the volume limit of the package. If step 706 is YES, subroutine 700 assigns the largest remaining item to the existing package at step 708. However, if adding the largest remaining item to the data structure representing a package would result in a volume greater than the volume limit of the package, step 706 is NO, and subroutine 700 proceeds to step 710 to determine if there are any remaining packages that have not yet been considered.

If there are remaining packages of the group, step 710 is YES, and subroutine 700 selects the next package at 712. Subroutine 700 then returns to step 706 until a package with sufficient empty volume is identified. Thus, subroutine 700 iteratively attempts to simulate packing a largest remaining item of a group into existing packages, as described above, until a total volume of the largest remaining item and items assigned to an existing package is less than the volume limit of the package. In some embodiments, subroutine 700 may iteratively attempt to simulate packing a largest remaining item of a group into existing packages in order of package creation.

Alternatively, subroutine 700 may also attempt to simulate packing the largest remaining item into all existing packages and determine that no package contains sufficient empty volume to fit the largest remaining item of the group. In this case, step 710 is NO, and subroutine 700 proceeds to create an additional package at step 714. The largest remaining item is then assigned to the additional package at step 716.

Subroutine 700 may be repeated for each item in a group to ensure that packages are as full as possible without exceeding volume or weight thresholds. Additionally, subroutine 700 may be performed only within groups to ensure that, for instance, fragile items are not shipped with normal items even if a fragile item could fit in a box of normal items. Thus, by pre-sorting items in this way, a business may be able to ship fewer packages, thereby reducing costs, while also ensuring safe delivery of goods to enhance customer satisfaction.

Steps depicted in FIGS. 3-7, may follow the core algorithm outlined in the process 300 and FIG. 3 description. Each process is not limited to the specific set of steps and may comprise modifications, omissions and/or combinations of the core algorithm steps optimized to fit specifics of each subroutine.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computerized system for determining item groupings for packaging, comprising:
   at least one processor; and
   at least one non-transitory storage medium comprising instructions that, when executed by the at least one processor cause the at least one processor to perform steps comprising:
      receiving an order comprising at least one item;
      searching at least one data store to determine a tag, a volume, and a weight for each item of the order;
   searching the at least one data store to determine an exclusion list of items that may not be in a same package as a hazardous item;
   sorting the items into one or more groups based on the tags of the items; and
   for each of the one or more groups:
      creating one or more data structures representing one or more packages; and
      iteratively simulating packing a largest remaining item of the group until all items of the group have been packaged, comprising:
         simulating packing into the largest remaining item of the group into a first package of the one or more packages,
         determining whether simulating packing the first package exceeds one or more thresholds,
         if the simulation into the first package exceeds at least one threshold of the one or more thresholds, simulating packing the largest remaining item of the group into one or more remaining packages of the one or more packages,
         determining whether simulating packing the remaining packages exceeds the one or more thresholds,
         if the simulation into the remaining packages exceeds at least one threshold of the one or more thresholds, creating an additional data structure representing an additional package and simulating packing the largest remaining item of the group into the additional package, and
         if one of the simulation into the first package or into the remaining packages includes the hazardous item and at least one item included in the exclusion list of items, assigning the hazardous item to a different package of the one or more packages.

2. The system of claim 1, wherein the one or more thresholds comprises at least one of a volume of the first package of a weight limit of the first package.

3. The system of claim 1, wherein the tags include fragile, standalone, or normal.

4. The system of claim 3, wherein the steps further comprise:
   determining that the received order comprises at least one item associated with the standalone tag; and
   searching the at least one data store to determine a binding number associated with the at least one item having the standalone tag; wherein the one or more thresholds comprise the binding number.

5. The system of claim 1, wherein the steps further comprise:
   searching the at least one data store to determine a large purchase quantity associated with each item of the order; and
   assigning a large purchase tag to items of a same type if a quantity of the items of the same type in the order exceeds a large purchase quantity associated with items of the same type.

6. The system of claim 5, wherein the steps further comprise:
   iteratively simulating packing items having the large purchase tag by dividing a group having items of the same type into subgroups until a volume and a weight of each subgroup are less than or equal to a volume limit and a weight limit, respectively, of one or more packages.

7. The system of claim 1, wherein the steps further comprise:
   searching the at least one data store to determine an exclusion list of one or more hazardous items that may not be in a same package as an item; and
   if one of the simulation into the first package or into the remaining packages includes the item and at least one of the hazardous items included in the exclusion list of items, assigning the at least one hazardous items to a different package of the one or more packages.

8. The system of claim 1, wherein an item having a fragile tag indicates that an item volume for the item having the fragile tag comprises the volume of the item and the volume of added packaging material.

9. The system of claim 1, wherein the steps further comprise:
   determining a volume and a weight of one or more items simulated to be packed in a last package of the group; and
   if the volume and the weight of the one or more items are less than a volume limit and a weight limit, respectively, of a smaller last package having a small volume than the last package, assigning the one or more items simulated into the last package to the smaller last package.

10. A computer-implemented method for automatically determining item groupings for packaging, comprising:
    receiving an order comprising at least one item;
    searching at least one data store to determine a tag, a volume, and a weight for each item of the order;
    searching the at least one data store to determine an exclusion list of items that may not be in a same package as a hazardous item;
    sorting the items into one or more groups based on the tags of the items; and for each of the one or more groups:
  creating one or more data structures representing one or more packages; and
  iteratively simulating packing a largest remaining item of the group until all items of the group have been packaged, comprising:
    simulating packing the largest remaining item of the group into a first package of the one or more packages;
    determining whether the simulation into the first package exceeds one or more thresholds,
    if the simulation into the first package exceeds at least one threshold of the one or more thresholds, simulating packing the largest remaining item of the group into one or more remaining packages of the one or more packages,
    determining whether the simulation into the remaining packages exceeds the one or more thresholds, and
    if the simulation into the remaining packages exceeds at least one threshold of the one or more thresholds, creating an additional data structure representing an additional package and simulating packing the largest remaining item of the group into the additional package, and
    if one of the simulation into the first package or into the remaining packages includes the hazardous item and at least one item included in the exclusion list of items, assigning the hazardous item to a different package of the one or more packages.

11. The method of claim 10, wherein the one or more thresholds comprise at least one of a volume of the first package or a weight limit of the first package.

12. The method of claim 10, wherein the tags include fragile, standalone, or normal.

13. The method of claim 12, further comprising:
  determining that the received order comprises at least one item associated with the standalone tag; and
  searching the at least one data store to determine a binding number associated with the at least one item having the standalone tag; wherein the one or more thresholds comprises the binding number.

14. The method of claim 10, further comprising:
  searching the at least one data store to determine a large purchase quantity associated with each item of the order; and
  assigning a large purchase tag to items of a same type if a quantity of the items of the same type in the order exceeds a large purchase quantity associated with items of the same type.

15. The method of claim 14, further comprising:
  iteratively simulating packing items having the large purchase tag by dividing a group having items of the same type into subgroups until a volume and a weight of each subgroup are less than or equal to a volume limit and a weight limit, respectively, of one or more packages.

16. The method of claim 10, further comprising:
  searching the at least one data store to determine an exclusion list of one or more hazardous items that may not be in a same package as an item; and
  if one of the simulation into the first package or into the remaining packages includes the item and at least one of the hazardous items included in the exclusion list of items, assigning the at least one of the hazardous items to a different package of the one or more packages.

17. The method of claim 10, wherein an item having a fragile tag indicates that an item volume for the item having the fragile tag comprises the volume of the item and the volume of added packaging material.

18. The method of claim 10, further comprising:
  determining a volume and a weight of one or more items simulated to be packed in a last package of the group; and
  if the volume and the weight of the one or more items are less than a volume limit and a weight limit, respectively, of a smaller last package having a smaller volume than the last package, assigning the one or more items simulated into the last package to the smaller last package.

* * * * *

UNITED STATES PATENT AND TRADEMARK OFFICE
CERTIFICATE OF CORRECTION

PATENT NO. : 11,727,354 B2
APPLICATION NO. : 17/644556
DATED : August 15, 2023
INVENTOR(S) : Xiaohua Cui et al.

It is certified that error appears in the above-identified patent and that said Letters Patent is hereby corrected as shown below:

In the Claims

Claim 9, Column 20, Line 54, "small volume" should read as --smaller volume--.

Signed and Sealed this
Seventeenth Day of September, 2024

Katherine Kelly Vidal
*Director of the United States Patent and Trademark Office*